United States Patent
Tsirkin

(10) Patent No.: US 10,871,982 B2
(45) Date of Patent: *Dec. 22, 2020

(54) VIRTUAL PROCESSOR SCHEDULING VIA MEMORY MONITORING

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,970

(22) Filed: Jul. 17, 2018

(65) Prior Publication Data
US 2018/0341510 A1  Nov. 29, 2018

Related U.S. Application Data

(63) Continuation of application No. 15/439,606, filed on Feb. 22, 2017, now Pat. No. 10,055,248.

(51) Int. Cl.
*G06F 9/455* (2018.01)
*G06F 9/48* (2006.01)
(Continued)

(52) U.S. Cl.
CPC ........ *G06F 9/45558* (2013.01); *G06F 3/0625* (2013.01); *G06F 3/0653* (2013.01);
(Continued)

(58) Field of Classification Search
CPC .. G06F 9/455; G06F 9/45533; G06F 9/45558; G06F 2009/45575; G06F 2009/45579; G06F 2009/45583; G06F 9/48; G06F 9/4806; G06F 9/4812; G06F 9/4843; G06F 9/485; G06F 9/4881; G06F 9/46; G06F 9/461
See application file for complete search history.

(56) References Cited

U.S. PATENT DOCUMENTS 8,112,648 B2   2/2012  Branover et al.
8,207,994 B2   6/2012  Ohno
(Continued)

OTHER PUBLICATIONS

USPTO, Office Action for U.S. Appl. No. 15/439,606, dated Apr. 12, 2017.
(Continued)

*Primary Examiner* — Charles M Swift
(74) *Attorney, Agent, or Firm* — Lowenstein Sandler LLP

(57) ABSTRACT

Systems and methods for scheduling virtual processors via memory monitoring are disclosed. An example method comprises: detecting, by a hypervisor of a host computer system, an event associated with a virtual processor running on a physical processor of the host computer system; testing a polling flag residing in a memory accessible by guest software running on the virtual processor, wherein a first state of the polling flag indicates that the virtual processor is monitoring modifications to a memory region comprising a waiting task flag, and wherein the waiting task flag indicates whether a task has been queued for the virtual processor; setting the polling flag to a second state, wherein testing the polling flag and setting the polling flag to the second state is performed in an atomic operation; and processing the detected event.

20 Claims, 6 Drawing Sheets

(51) Int. Cl.
*G06F 9/50* (2006.01)
*G06F 9/46* (2006.01)
*G06F 3/06* (2006.01)

(52) U.S. Cl.
CPC ............ *G06F 3/0673* (2013.01); *G06F 9/455* (2013.01); *G06F 9/45533* (2013.01); *G06F 9/46* (2013.01); *G06F 9/461* (2013.01); *G06F 9/48* (2013.01); *G06F 9/485* (2013.01); *G06F 9/4806* (2013.01); *G06F 9/4812* (2013.01); *G06F 9/4843* (2013.01); *G06F 2009/45575* (2013.01); *G06F 2009/45579* (2013.01); *G06F 2009/45583* (2013.01); *G06F 2009/45591* (2013.01); *Y02D 10/00* (2018.01)

(56) References Cited

U.S. PATENT DOCUMENTS

| | | | |
|---|---|---|---|
| 8,239,610 | B2 | 8/2012 | van Riel et al. |
| 8,261,284 | B2 | 9/2012 | Loeser |
| 8,752,058 | B1 | 6/2014 | Zheng et al. |
| 8,752,060 | B2 | 6/2014 | Hsieh et al. |
| 9,317,318 | B2 | 4/2016 | Zheng et al. |
| 2009/0049451 | A1* | 2/2009 | Bates ............... G06F 9/461 718/108 |
| 2009/0254680 | A1 | 10/2009 | Pfister |
| 2011/0093851 | A1 | 4/2011 | Messmer et al. |
| 2012/0036292 | A1 | 2/2012 | Anand et al. |
| 2013/0138760 | A1 | 5/2013 | Tsirkin |
| 2014/0075163 | A1 | 3/2014 | Loewenstein et al. |
| 2014/0351471 | A1 | 11/2014 | Jebson et al. |
| 2015/0058846 | A1 | 2/2015 | Zheng et al. |
| 2015/0347169 | A1 | 12/2015 | Tsirkin |
| 2016/0117190 | A1 | 4/2016 | Sankaran et al. |
| 2018/0060574 | A1* | 3/2018 | White ............... G06F 21/57 |

OTHER PUBLICATIONS

USPTO, Final Office Action for U.S. Appl. No. 15/439,606, dated Aug. 2, 2017.
USPTO, Office Action for U.S. Appl. No. 15/439,606, dated Nov. 20, 2017.
USPTO, Advisory Action for U.S. Appl. No. 15/439,606, dated Oct. 17, 2017.
USPTO, Notice of Allowance for U.S. Appl. No. 15/439,606, dated Apr. 20, 2018.
"Atomicity—atomic operations and atomic transactions", https://stackoverflow.com/questions/15658828/atomic-operations-andatomic-transactions/2#2, posted on Mar. 27, 2013, pp. 1-2.
Somlo, Gabriel L., "Handling of Guest-Mode MONITOR and MWAIT", http://www.contrib.andrew.cmu.edu/-somlo/OSXKVM/mwait.html, Feb. 5, 2014, 3 pages.
Vouk, Nikola, "Buddy Threading in Distributed Applications on Simultaneous Multi-Threading Processors", http://moss.csc.ncsu.edu/~mueller/ftp/pub/mueller/theses/nvouk-th.pdf, 2005, 96 pages.

\* cited by examiner

VIRTUAL PROCESSOR SCHEDULING VIA MEMORY MONITORING

RELATED APPLICATIONS

This application is a continuation of U.S. patent application Ser. No. 15/439,606 filed on Feb. 22, 2017, the entire content of which is incorporated by reference herein.

TECHNICAL FIELD

The present disclosure is generally related to virtualized computer systems, and more particularly, efficient scheduling of virtual processors via memory monitoring.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
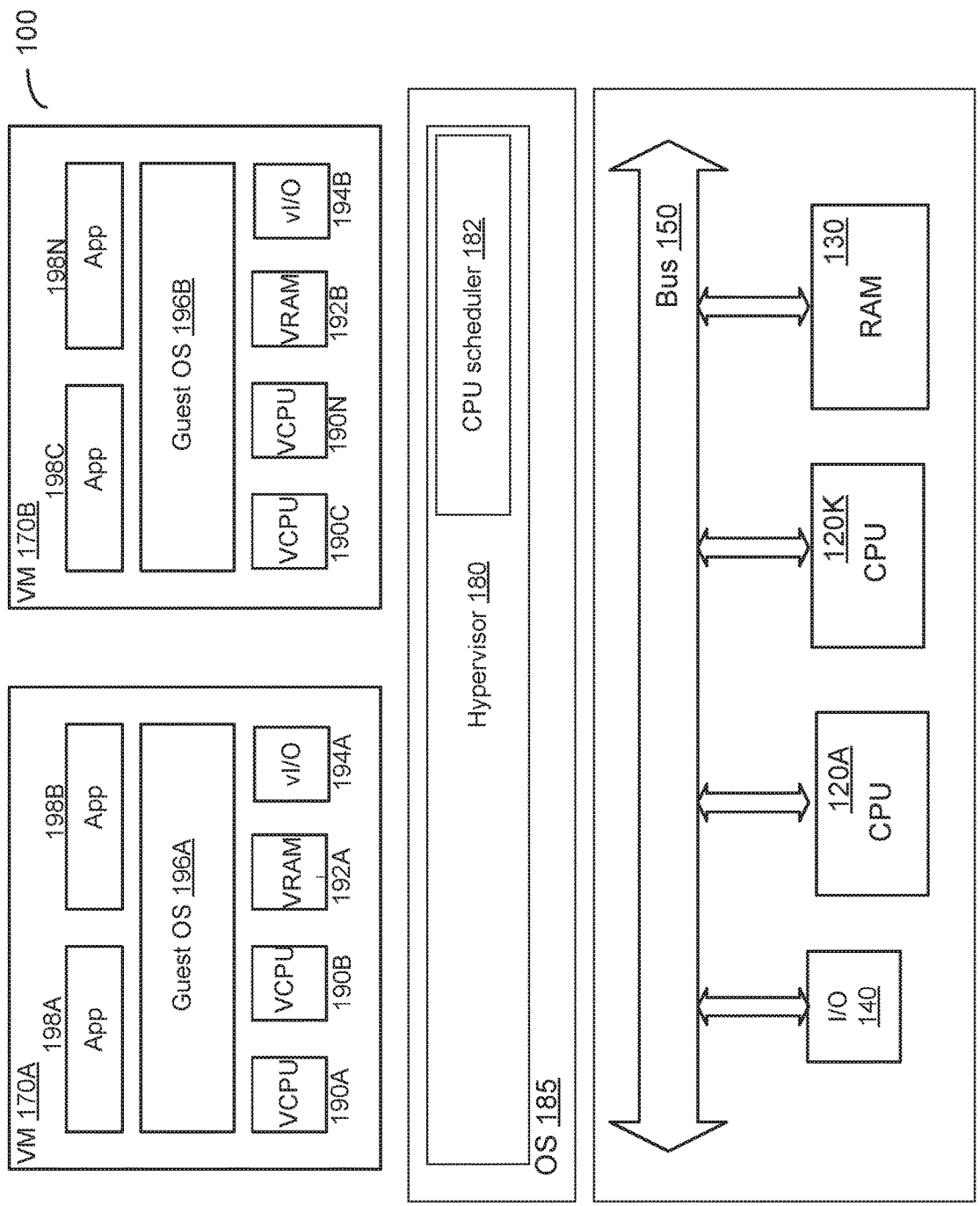
FIG. 1 depicts a high-level component diagram of an illustrative example of a computer system 100 operating in accordance with one or more aspects of the present disclosure.

A common approach to queuing a task for execution by a processor (also referred herein as a "central processing unit" or CPU) of a multi-processor system may involve sending an inter-processor interrupt (IPI) to the target CPU. A more resource-efficient way of queuing a task involves memory monitoring by the target idle CPU, which may be performed, e.g., using x86-64 MONITOR/MWAIT instructions, their analogs on other execution platforms, or other memory access instructions. The MONITOR instruction initiates monitoring, by platform-specific address monitoring hardware, of a specified address range. The corresponding MWAIT instruction causes the processor to enter a specified implementation-dependent optimized state while waiting for a store operation to the specified address range. The processor would eventually exit the implementation-dependent optimized state responsive to detecting, by the monitoring hardware, a store operation with respect to a memory location within the specified address range. The implementation-dependent optimized state may, for example, be represented by one of low power consumption "sleeping" states.

In order to implement a task scheduling mechanism, an idle CPU of a multi-processor system may set a polling flag indicating its memory monitoring state and may subsequently transition to a memory monitoring state, e.g., by executing the MONITOR/MWAIT instructions or other memory access instructions. Another CPU may execute an atomic operation to test the polling flag of the idle CPU and set a waiting task flag indicating that a task has been queued for the idle CPU. The waiting task flag may reside within the memory address range that is being monitored by the idle CPU, and thus the modification of the waiting task flag would trigger the monitoring hardware and cause the idle CPU to exit the memory monitoring state. Upon exiting the memory monitoring state, the idle CPU may test the waiting task flag and proceed to executing the waiting task if the waiting task flag is set or return to the memory monitoring state otherwise.

However, the above-described approach would fail if the above-described CPU scheduling code was executed, unmodified, in a virtualized environment in which more than one virtual CPU (vCPU) is assigned to a single physical CPU. For example, each vCPU may be implemented by a respective processing thread that may be scheduled to run on one of the host CPUs. In a hypothetical scenario, an idle vCPU may set a polling flag indicating its memory monitoring state and may subsequently transition into a memory monitoring state, e.g., by executing the MONITOR/MWAIT instructions or other memory access instructions. Upon expiration of the time slice allocated to the idle vCPU on the associated physical CPU, the processing thread implementing the idle vCPU may be preempted and another vCPU may be scheduled to run on that physical CPU. While the idle vCPU is not scheduled to run on the physical CPU, it is not monitoring the specified memory range, but the polling flag remains set irrespective of the vCPU scheduling status on the physical CPU. This may lead to another vCPU attempting to queue a task for the idle vCPU while the idle vCPU is not running on the physical CPU. However, since the memory monitoring hardware is not performing memory monitoring at that time, the idle vCPU would not exit the memory monitoring state upon being scheduled again to run on the physical CPU. Thus, an attempt to schedule a task for the idle vCPU would fail if the unmodified CPU scheduling code is executed in the virtualized environment.

The systems and methods of the present disclosure alleviate these and other deficiencies of conventional CPU scheduling methods, by providing a method for efficient virtual processor scheduling via memory monitoring. In accordance with one or more aspects of the present disclosure, a virtual machine executing the above-described CPU scheduling code may notify the hypervisor of the location of the flags employed for task queuing. The hypervisor may then configure the virtual machine control structure (VMCS) to allow the virtual machine execute MONITOR/MWAIT instructions (or other memory access instructions) without causing a VM exit. "VM exit" herein shall refer to a transition from an unprivileged guest execution mode to the privileged virtual machine extension (VMX) root execution mode in response to detecting one of the triggering events (such as an attempt to execute a certain privileged instruction or to access a certain memory address).

Thus, an idle vCPU may set a polling flag indicating its memory monitoring state and may subsequently transition to a memory monitoring state (e.g., by executing the MONITOR/MWAIT instructions or other memory access instructions), thus allowing another vCPU to queue a task for execution by the idle vCPU in accordance with the above-described procedure. A task switch that involves preempting the processing thread implementing the idle vCPU (e.g., in order to schedule another vCPU to run on the physical CPU) would transfer the execution control to the hypervisor.

Upon receiving the execution control on the task switch event, the hypervisor managing the virtual machine may perform an atomic operation to test the polling flag of the exiting vCPU and clear the polling flag if the testing operation has indicated that the polling flag was set. Clearing the polling flag prevents other vCPUs from attempting to notify the exiting vCPU via the memory monitoring mechanism, and thus prevents the task notification mechanism from an otherwise possible failure due to inability of the idle vCPU to detect flag modification that is performed while the processing thread implementing the idle vCPU is not scheduled to run, as explained herein above.

In certain implementations, if the above-referenced polling flag testing operation returns the polling state of the polling flag (thus indicating the memory monitoring state of the associated vCPU), the hypervisor may quiesce the vCPU (e.g., by causing it to execute the HLT instruction which halts the processor). Quiescing the vCPU causes it to transition to a low power consumption state, thus improving the overall power efficiency of the system. In certain implementations, before quiescing the vCPU, the hypervisor may additionally test the waiting task flag and proceed to quiescing the vCPU if the waiting task flag is in the idle (e.g., cleared) state indicating that no task has been queued for the vCPU, thus leaving the vCPU in a runnable state if a task has already been queued for that vCPU.

Thus, the systems and methods described herein represent improvements to the functionality of general purpose or specialized computing devices, by allowing the CPU scheduling code that utilizes memory monitoring be executed in a virtualized environment. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Computer system 100 may run one or more virtual machines 170A-170B, by executing a virtual machine manager 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors 120, memory 130, and I/O devices 140, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more guest applications 198A-198N may be running on a virtual machine 170 under a guest operating system 196. Guest operating system and guest applications are collectively referred to herein as "guest software."

In certain implementations, processor virtualization may be implemented by the hypervisor scheduling time slots on one or more physical processors for virtual processors. In an illustrative example, a virtual processor may be implemented by a processing thread that may be scheduled to run on one of the host physical processors.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary.

Various vCPU scheduling functions may be performed by a vCPU scheduler component 182 running on host computer system 100 and operating in accordance with one or more aspects of the present disclosure. In certain implementations, vCPU scheduler component 182 may be implemented as a software component invoked by hypervisor 180. Alternatively, functions of vCPU scheduler component 182 may be performed by hypervisor 180.

Figure 2:
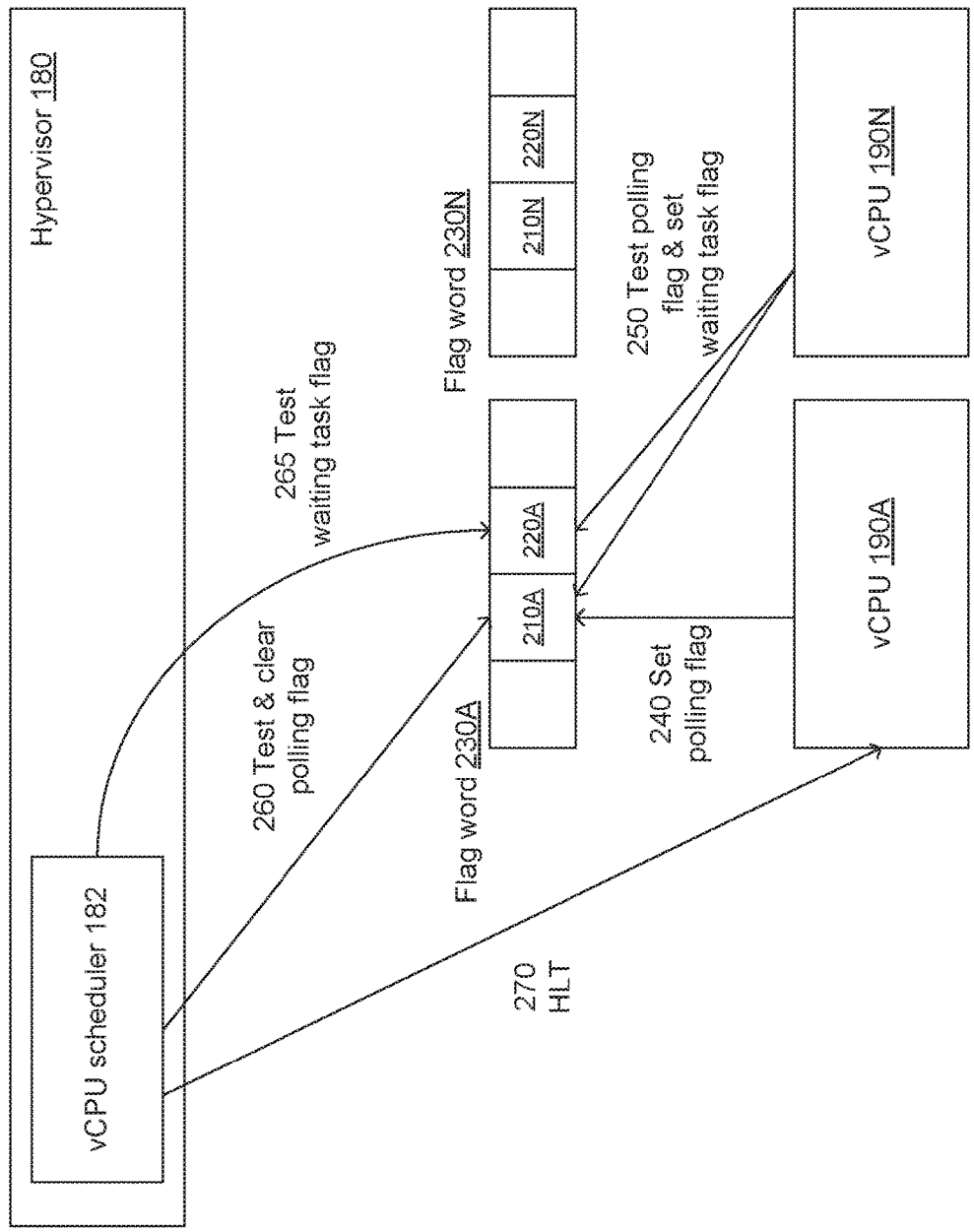
FIG. 2 schematically illustrates the data structures utilized by the systems and methods operating in accordance with one or more aspects of the present disclosure.

FIG. 2 schematically illustrates the data structures utilized by the systems and methods operating in accordance with one or more aspects of the present disclosure. In certain implementations, each vCPU 190A-190N may be implemented by a respective processing thread that may be scheduled to one of the host CPUs 120A-120K of FIG. 1. In an illustrative example, the polling flag 210 and waiting task flag 220 associated with the vCPU 190A may reside within the flag word 230 of a system data structure associated with the processing thread (e.g., task_struct data structure in the Linux operating system). Alternatively, the polling flag 210 and waiting task flag 220 associated with the vCPU may be a part of a memory data structure residing in some other location of the guest memory. The guest memory may be represented by the random access memory (RAM) accessible by the guest software running on the vCPU 190A, a memory of a virtual device associated with the virtual machine, or any other memory writable by the virtual machine.

In operation, a virtual machine may, upon start-up, notify the hypervisor of the guest memory location of the per-vCPU flag words 230A-230N storing the polling flag 210A-210N and waiting task flag 220A-22-N. Alternatively, the hypervisor may cause the virtual machine to store the per-vCPU flag word 230 at a specified guest memory location. Therefore, both the hypervisor and the virtual machine would be able to access and modify the per-vCPU flag words 230 storing the polling flag 210 and waiting task flag 220. The hypervisor may then configure the VMCS of the virtual machine to allow the virtual machine execute MONITOR/MWAIT instructions (or other memory access instructions) without causing a VM exit.

An idle vCPU 190A may set (operation 240) a polling flag 210A to indicate that it is monitoring the state of the waiting task flag 220A. vCPU 190A may then transition to a memory monitoring state (e.g., by executing the MONITOR/MWAIT instructions or other memory access instructions).

Another vCPU, e.g., vCPU 190B, may execute an atomic operation 250 to test the polling flag 210A of the idle CPU 190A and set a waiting task flag 220A indicating that a task has been queued for the idle CPU 190A. As the waiting task flag 220A resides within the memory address range that is being monitored by the idle CPU 190A, the modification of the waiting task flag 220A would trigger the monitoring hardware and cause the idle CPU 190A to exit the memory monitoring state. Upon exiting the memory monitoring state, the idle CPU 190A may test the waiting task flag 220A and proceed to executing the waiting task if the waiting task flag 220A is in the task waiting (e.g., set) state or return to the memory monitoring state otherwise.

Irrespectively of and asynchronously with respect to the above-described activity of the vCPU 190B, the time slice allocated to the processing thread implementing vCPU 190A on the physical CPU may expire, thus causing the preemption of the processing thread by a task switch event (e.g., in order to schedule another vCPU to run on the physical CPU) and therefore transferring the execution control to the hypervisor.

Upon determining that the task switch event is caused by preemption of the processing thread implementing vCPU 190A, hypervisor 180, by the vCPU scheduler component 182 of FIG. 1, may execute an atomic operation 260 to test the polling flag 210 of the exiting vCPU 190A and set the polling flag 210 to the non-polling (e.g., cleared) state if the testing operation 260 has indicated that the polling flag 210 was in the polling (e.g., set) state. Setting the polling flag 210 to the non-polling state prevents other vCPUs (e.g., vCPU 190B) from attempting to notify the exiting vCPU 190A via the memory monitoring mechanism, and thus prevents the task notification mechanism from an otherwise possible failure due to inability of the idle vCPU 190A to detect flag modification that is performed while the processing thread implementing the idle vCPU 190A is not scheduled to run.

In certain implementations, if the polling flag testing operation 260 returns the polling (e.g., set) state of the polling flag 210 (thus indicating the memory monitoring state of the associated vCPU 190A), the hypervisor may quiesce (operation 270) the vCPU 190A (e.g., by causing it to execute the HLT instruction which halts the vCPU). In certain implementations, before quiescing the vCPU 190A, the hypervisor may additionally test (operation 265) the waiting task flag and proceed to quiescing the vCPU if the waiting task flag is in the idle (e.g., cleared) state indicating that no task has been queued for the vCPU 190A, thus leaving the vCPU 190A in a runnable state if a task has already been queued for vCPU 190A.

Figure 3:
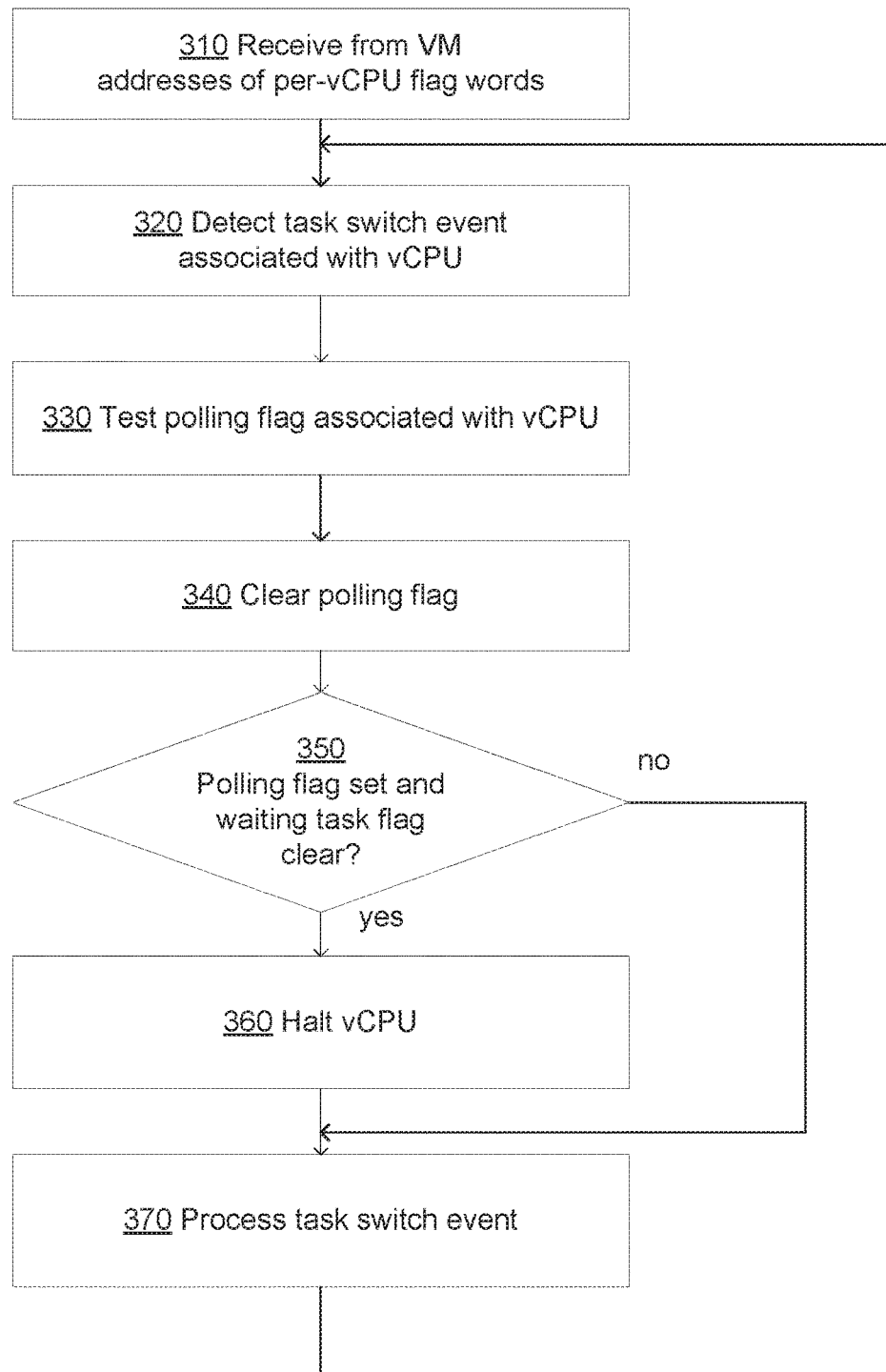
FIG. 3 is a flow diagram of an example method of scheduling of virtual processors via memory monitoring, in accordance with one or more aspects of the present disclosure.

FIG. 3 is a flow diagram of an example method of scheduling of virtual processors via memory monitoring, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500-600 of FIGS. 5-6) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at block 310, a hypervisor of the host computer system implementing the method may receive, from a virtual machine, an address of a data structure that stores per-vCPU polling flags and waiting task flags. Alternatively, the hypervisor may cause the virtual machine to store the data structure at a specified memory address, as described in more detail herein above.

At block 320, the hypervisor may detect a task switch event associated with a virtual processor running on a physical processor of the host computer system. The task switch event may be caused by preemption of the processing thread implementing the virtual processor (e.g., due to expiration of a time slice allocated to the processing thread), as described in more detail herein above.

At block 330, the hypervisor may test a polling flag associated with the virtual processor and store the polling flag state in a memory variable. The polling flag may reside in the guest memory accessible by the guest software running on the virtual processor, as described in more detail herein above.

At block 340, the hypervisor may set the polling flag to the non-polling state (e.g., clear the polling flag). In certain implementations, testing and clearing the polling flag may be performed in an atomic operation, as described in more detail herein above.

At block 350, the hypervisor may test the waiting task flag associated with the virtual processor. Responsive to determining, at block 350, that the testing operation of block 330 returned the polling state of the polling flag and that the waiting task flag is currently in the idle (e.g., cleared) state indicating that no task has been queued for the virtual processor, the hypervisor may, at block 360, quiesce the virtual processor. In an illustrative example, the hypervisor may cause the virtual processor to execute the HLT instruction.

At block 370, the hypervisor may process the task switch event. In an illustrative example, the hypervisor may schedule another vCPU to run on the physical processor, as described in more detail herein above. Responsive to completing the operations of block 370, the method may terminate.

Figure 4:
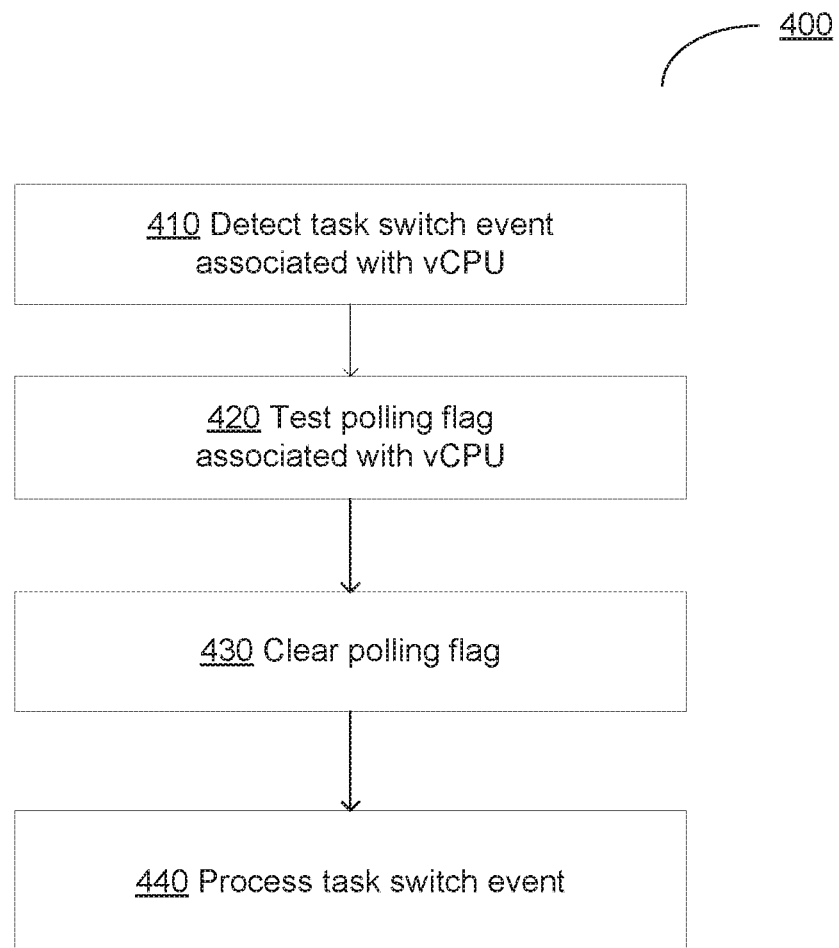
FIG. 4 is a flow diagram of another example method of scheduling of virtual processors via memory monitoring, in accordance with one or more aspects of the present disclosure.

FIG. 4 is a flow diagram of another example method of scheduling of virtual processors via memory monitoring, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500-600 of FIGS. 5-6) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at block 410, a hypervisor of the host computer system implementing the method may detect a task switch event associated with a virtual processor running on a physical processor of the host computer system. The task switch event may be caused by preemption of the processing thread implementing the virtual processor (e.g., due to expiration of a time slice allocated to the processing thread), as described in more detail herein above.

At block 420, the hypervisor may test a polling flag associated with the virtual processor. The polling flag may reside in the guest memory accessible by the guest software running on the virtual processor, as described in more detail herein above.

At block 430, the hypervisor may set the polling flag to the non-polling second state (e.g., clear the polling flag). In certain implementations, testing and clearing the polling flag may be performed in an atomic operation, as described in more detail herein above.

At block 440, the hypervisor may process the task switch event. In an illustrative example, the hypervisor may schedule another vCPU to run on the physical processor, as described in more detail herein above. Responsive to completing the operations of block 440, the method may terminate.

Figure 5:
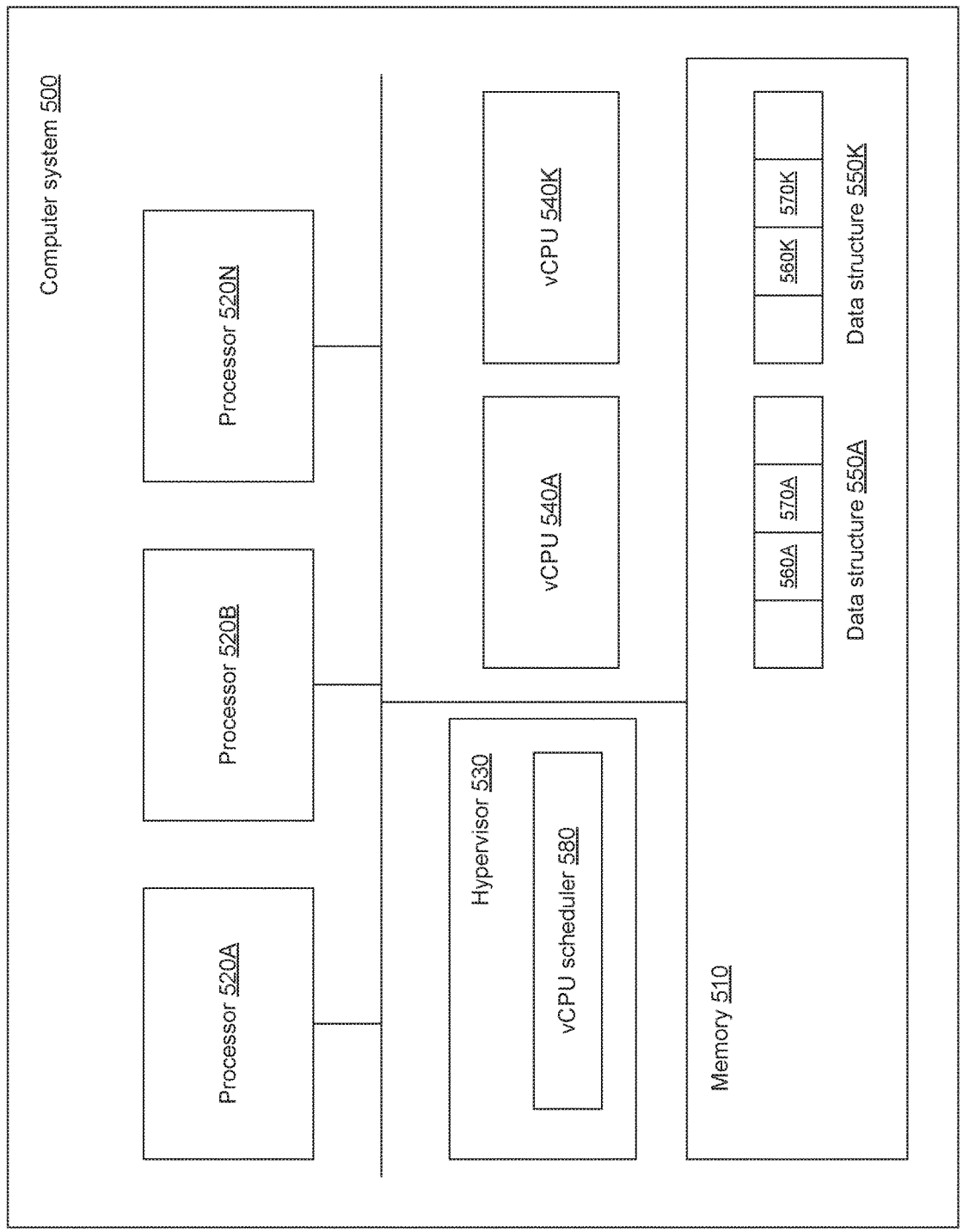
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and executes code implementing hypervisor 530 and processing threads implementing virtual processors 540A-540K. The memory may store per-vCPU data 560 structures 550A-550K to store polling flags 560A-560K and waiting task flags 570A-570K. The hypervisor may include a vCPU scheduler component 580 operating in accordance with one or more aspects of the present disclosure. In an illustrative example, vCPU scheduler component 580 may implement methods 300 and/or 400 of FIGS. 3-4.

Figure 6:
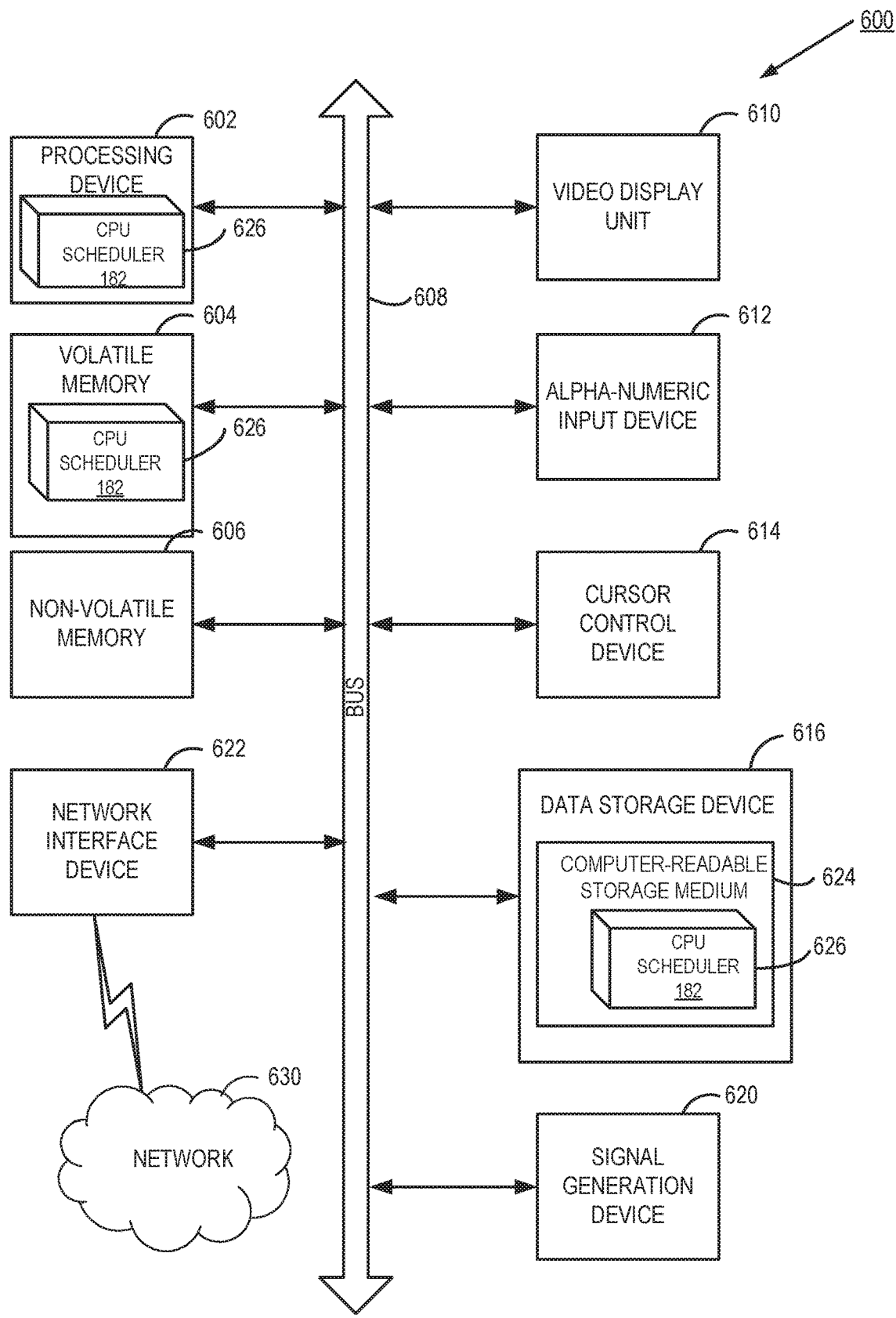
FIG. 6 depicts a block diagram of another illustrative computer system operating in accordance with one or more aspects of the disclosure.

FIG. 6 depicts a block diagram of another illustrative computer system 600 operating in accordance with one or more aspects of the disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC)

microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300-400 of FIGS. 3-4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    configuring, by a hypervisor of a host computer system, a virtual machine control structure (VMCS) associated with a virtual machine to allow the virtual machine execute memory monitoring instructions without triggering a virtual machine exit event;
    detecting, by the hypervisor, an event associated with a first virtual processor associated with the virtual machine;
    testing a polling flag residing in a memory accessible by guest software running on the first virtual processor, wherein a first state of the polling flag indicates that the first virtual processor is monitoring modifications to a memory region comprising a waiting task flag, and wherein the waiting task flag indicates whether a task has been queued for the first virtual processor;
    setting the polling flag to a second state, wherein the second state prevents a second virtual processor associated with the virtual machine from notifying the first virtual processor via the waiting task flag, and wherein testing the polling flag and setting the polling flag to the second state is performed in an atomic operation; and
    processing the detected event.

2. The method of claim 1, further comprising:
    responsive to determining that testing the polling flag indicates the first state of the polling flag, quiescing the first virtual processor.

3. The method of claim 1, further comprising:
    responsive to determining that testing the polling flag indicates the first state of the polling flag and that the waiting task flag is in an idle state indicating that no tasks have been queued for the first virtual processor, quiescing the first virtual processor.

4. The method of claim 1, wherein processing the detected event further comprises:
    scheduling the second virtual processor to run on the physical processor.

5. The method of claim 1, further comprising:
    receiving, from a virtual machine associated with the first virtual processor, an address of a data structure comprising the polling flag.

6. The method of claim 1, further comprising:
    transmitting, to a virtual machine associated with the first virtual processor, an address of a data structure comprising the polling flag.

7. The method of claim 1, further comprising:
responsive to determining that testing the polling flag indicates the first state of the polling flag and that the waiting task flag is set to indicate that a task has been queued for the first virtual processor, leaving the first virtual processor in a runnable state.

8. The method of claim 1, wherein the detected event involves preempting a processing thread implementing the first virtual processor.

9. A computer system, comprising:
a memory to store a data structure accessible by guest software running on a first virtual processor, the data structure comprising a polling flag and a waiting task flag associated with the first virtual processor; and
a processor, operatively coupled to the memory, to:
configure a virtual machine control structure (VMCS) associated with a virtual machine to allow the virtual machine execute memory monitoring instructions without triggering a virtual machine exit event;
detect an event associated with a first virtual processor associated with the virtual machine running on the processor;
test a polling flag residing in a memory accessible by guest software running on the first virtual processor, wherein a first state of the polling flag indicates that the first virtual processor is monitoring modifications to a memory region comprising a waiting task flag, and wherein the waiting task flag indicates whether a task has been queued for the first virtual processor;
set the polling flag to a second state, wherein the second state prevents a second virtual processor associated with the virtual machine from notifying the first virtual processor via the waiting task flag, and wherein testing the polling flag and setting the polling flag to the second state is performed in an atomic operation; and
process the detected event.

10. The computer system of claim 9, wherein the processor is further to:
responsive to determining that testing the polling flag indicates the first state of the polling flag, quiesce the first virtual processor.

11. The computer system of claim 9, wherein the processor is further to:
responsive to determining that testing the polling flag indicates the first state of the polling flag and that the waiting task flag is in an idle state indicating that no tasks have been queued for the first virtual processor, quiesce the first virtual processor.

12. The computer system of claim 9, wherein processing the detected event further comprises:
scheduling the second virtual processor to run on the physical processor.

13. The computer system of claim 9, wherein the processor is further to:
responsive to determining that testing the polling flag indicates the first state of the polling flag and that the waiting task flag is set to indicate that a task has been queued for the first virtual processor, leave the first virtual processor in a runnable state.

14. The computer system of claim 9, wherein the detected event involves preempting a processing thread implementing the first virtual processor.

15. A non-transitory computer-readable storage medium comprising executable instructions that, when executed by a physical processor of a host computer system, cause the physical processor to:
configure a virtual machine control structure (VMCS) associated with a virtual machine to allow the virtual machine execute memory monitoring instructions without triggering a virtual machine exit event;
detect an event associated with a first virtual processor associated with the virtual machine running on a physical processor of the host computer system;
test a polling flag residing in a memory accessible by guest software running on the first virtual processor, wherein a first state of the polling flag indicates that the first virtual processor is monitoring modifications to a memory region comprising a waiting task flag, and wherein the waiting task flag indicates whether a task has been queued for the first virtual processor;
set the polling flag to a second state, wherein the second state prevents a second virtual processor associated with the virtual machine from notifying the first virtual processor via the waiting task flag, and wherein testing the polling flag and setting the polling flag to the second state is performed in an atomic operation; and
process the detected event.

16. The non-transitory computer-readable storage medium of claim 15, further comprising executable instructions to cause the physical processor to:
responsive to determining that testing the polling flag indicates the first state of the polling flag, quiesce the first virtual processor.

17. The non-transitory computer-readable storage medium of claim 15, further comprising executable instructions to cause the physical processor to:
responsive to determining that testing the polling flag indicates the first state of the polling flag and that the waiting task flag is in an idle state indicating that no tasks have been queued for the first virtual processor, quiesce the first virtual processor.

18. The non-transitory computer-readable storage medium of claim 15, wherein processing the detected event further comprises:
scheduling the second virtual processor to run on the physical processor.

19. The non-transitory computer-readable storage medium of claim 15, further comprising executable instructions to cause the physical processor to:
responsive to determining that testing the polling flag indicates the first state of the polling flag and that the waiting task flag is set to indicate that a task has been queued for the first virtual processor, leave the first virtual processor in a runnable state.

20. The non-transitory computer-readable storage medium of claim 15, wherein the detected event involves preempting a processing thread implementing the first virtual processor.

* * * * *